(12) United States Patent
Hammad et al.

(10) Patent No.: US 10,133,788 B1
(45) Date of Patent: *Nov. 20, 2018

(54) DETERMINING RESOURCE QUALITY BASED ON RESOURCE COMPETITION

(71) Applicant: Google Inc., Mountain View, CA (US)

(72) Inventors: Moustafa A. Hammad, San Jose, CA (US); Hyung-Jin Kim, Sunnyvale, CA (US); Rajan Patel, Mountain View, CA (US); Thomas E. Bagby, San Francisco, CA (US)

(73) Assignee: Google LLC, Mountain View, CA (US)

( * ) Notice: Subject to any disclaimer, the term of this patent is extended or adjusted under 35 U.S.C. 154(b) by 512 days.

This patent is subject to a terminal disclaimer.

(21) Appl. No.: 14/660,388

(22) Filed: Mar. 17, 2015

Related U.S. Application Data (63) Continuation of application No. 13/562,620, filed on Jul. 31, 2012, now Pat. No. 9,020,927, which is a continuation-in-part of application No. 13/486,932, filed on Jun. 1, 2012.

(51) Int. Cl.
*G06F 17/30* (2006.01)

(52) U.S. Cl.
CPC .... *G06F 17/3053* (2013.01); *G06F 17/30864* (2013.01)

(58) Field of Classification Search
CPC .................. G06F 17/3053; G06F 17/30864
USPC .................................................. 707/709, 723
See application file for complete search history.

(56) References Cited

U.S. PATENT DOCUMENTS

| 5,826,261 A | 10/1998 | Spencer |
| 5,960,383 A | 9/1999 | Fleischer |
| 6,006,222 A | 12/1999 | Culliss |
| 6,014,665 A | 1/2000 | Culliss |

(Continued)

FOREIGN PATENT DOCUMENTS

EP  1505520 A3  5/2006

OTHER PUBLICATIONS

The Direct Hit Popularity Engine Technology a White Paper. [online] [retrieved on Apr. 2, 2009]. Retrieved from the Internet URL: http://www.uni-koblenz.de/FB4/Institues/ICV/AGKrause/Teachings/SS07/DirectHit.pdf, 5 pages.

*Primary Examiner* — Hares Jami
*Assistant Examiner* — Nargis Sultana
(74) *Attorney, Agent, or Firm* — Fish & Richardson P.C.

(57) ABSTRACT

Methods, systems, and apparatus for determining resource quality based on resource competition. In an aspect, a method comprises: for each of a plurality of resource locators: generating first value for the resource locator that indicates, for a plurality of first sets of search results that each include the resource locator, a number of occurrences of other resource locators that were impressed and not selected when the resource locator was selected; generating a second value for the resource locator that indicates, for a plurality of second sets of search results that each include the resource locator, a number of occurrences of other resource locators that were selected when the resource locator was impressed and not selected; and generating, based on a difference between the first value and the second value, an adjustment factor for the resource locator for adjusting a score associated with the resource locator during a search operation.

13 Claims, 7 Drawing Sheets

(56) References Cited

U.S. PATENT DOCUMENTS

| | | | |
|---|---|---|---|
| 6,029,195 A | 2/2000 | Herz | |
| 6,035,294 A | 3/2000 | Fish | |
| 6,078,916 A * | 6/2000 | Culliss | G06F 17/30696 |
| 6,182,067 B1 | 1/2001 | Presnell | |
| 6,199,081 B1 * | 3/2001 | Meyerzon | G06F 17/218 |
| | | | 707/999.006 |
| 6,272,507 B1 | 8/2001 | Pirolli | |
| 6,285,999 B1 | 9/2001 | Page | |
| 6,311,214 B1 | 10/2001 | Rhoads | |
| 6,321,228 B1 * | 11/2001 | Crandall | G06F 17/30864 |
| 6,360,215 B1 | 3/2002 | Judd | |
| 6,405,175 B1 | 6/2002 | Ng | |
| 6,421,675 B1 * | 7/2002 | Ryan | G06F 17/3061 |
| 6,473,752 B1 | 10/2002 | Fleming | |
| 6,480,837 B1 | 11/2002 | Dutta | |
| 6,732,088 B1 | 5/2004 | Glance | |
| 7,062,561 B1 | 6/2006 | Reisman | |
| 7,085,820 B1 | 8/2006 | Nickerson | |
| 7,283,992 B2 * | 10/2007 | Liu | G06F 17/30017 |
| 7,647,314 B2 * | 1/2010 | Sun | G06F 17/30864 |
| | | | 706/12 |
| 7,769,742 B1 * | 8/2010 | Brawer | G06F 17/30864 |
| | | | 707/709 |
| 7,801,868 B1 * | 9/2010 | Kaminski, Jr. | G06F 17/30244 |
| | | | 707/687 |
| 8,001,118 B2 | 8/2011 | Dean | |
| 8,195,654 B1 * | 6/2012 | Riley | G06F 17/30864 |
| | | | 706/12 |
| 8,250,065 B1 * | 8/2012 | Chambers | G06Q 10/10 |
| | | | 707/723 |
| 8,307,005 B1 * | 11/2012 | He | G06F 17/30 |
| | | | 707/791 |
| 8,341,150 B1 * | 12/2012 | Riley | G06F 17/30525 |
| | | | 707/728 |
| 8,370,337 B2 * | 2/2013 | Kanungo | G06N 99/005 |
| | | | 707/723 |
| 8,595,228 B1 * | 11/2013 | Horling | G06F 17/30867 |
| | | | 707/733 |
| 8,681,155 B2 * | 3/2014 | Basak | G06T 11/20 |
| | | | 345/440 |
| 2002/0078045 A1 | 6/2002 | Dutta | |
| 2005/0125392 A1 | 6/2005 | Curtis | |
| 2006/0064411 A1 * | 3/2006 | Gross | G06F 17/30864 |
| 2007/0055646 A1 * | 3/2007 | Zeng | G06F 17/30675 |
| 2008/0097891 A1 * | 4/2008 | Park | G06Q 40/00 |
| | | | 705/37 |
| 2008/0183664 A1 * | 7/2008 | Cancel | G06Q 30/02 |
| 2009/0106221 A1 | 4/2009 | Meyerzon | |
| 2009/0119261 A1 | 5/2009 | Ismalon | |
| 2009/0307198 A1 * | 12/2009 | Zhang | G06F 17/3087 |
| 2010/0106706 A1 * | 4/2010 | Rorex | G06F 17/30864 |
| | | | 707/709 |
| 2010/0153428 A1 * | 6/2010 | Schechter | G06F 17/30867 |
| | | | 707/768 |
| 2010/0235222 A1 * | 9/2010 | Farley | G06Q 30/02 |
| | | | 705/32 |
| 2011/0161260 A1 * | 6/2011 | Burges | G06F 17/30887 |
| | | | 706/12 |
| 2011/0179023 A1 | 7/2011 | Dean | |
| 2011/0258529 A1 * | 10/2011 | Doig | G06O 30/02 |
| | | | 715/234 |
| 2011/0289074 A1 * | 11/2011 | Leban | G06F 17/30991 |
| | | | 707/722 |
| 2011/0320824 A1 * | 12/2011 | Isozaki | H04N 21/2347 |
| | | | 713/189 |
| 2012/0078897 A1 * | 3/2012 | Kohanim | G06F 17/30991 |
| | | | 707/734 |
| 2012/0290637 A1 | 11/2012 | Perantatos | |
| 2013/0054631 A1 * | 2/2013 | Govani | G06F 17/30867 |
| | | | 707/767 |

* cited by examiner

DETERMINING RESOURCE QUALITY BASED ON RESOURCE COMPETITION

CROSS-REFERENCE TO RELATED APPLICATIONS

This application is a continuation application of, and claims priority to, U.S. patent application Ser. No. 13/562,620, titled "DETERMINING RESOURCE QUALITY BASED ON RESOURCE COMPETITION," filed on Jul. 31, 2012, which is a continuation-in-part application of and claims priority to U.S. application Ser. No. 13/486,932, filed on Jun. 1, 2012. disclosure of the foregoing applications are incorporated herein by reference in their entirety for all purposes.

BACKGROUND

This specification relates to determining resource quality based on resource competition.

The Internet enables access to a wide variety of resources, such as video or audio files, web pages for particular subjects, book articles, or news articles. A search engine can identify resources in response to a user query that includes one or more search terms or phrases. The search engine ranks the resources based on their relevance to the query and importance and provides search results that link to the identified resources, and orders the search results according to the rank.

For example, search results can be ranked based on signals and scores related to the resources identified by the search results, such as relevance scores that indicate the relevance of a particular resource with respect to a query, or an authority score that is a measure of relative importance of a resource relative to other resources. Signals may also be used to affect the ranking of resources. For example, a geographic signal may indicate that a particular resource should be ranked higher for users who send a query from the United States than for users who send the same query from Canada. Many other signals can be used to rank resources.

SUMMARY

A competition signal can be used to rank resources. In general, one aspect of the subject matter described in this specification can be embodied in methods that include the actions of for each of a plurality of resource locators: generating a first value for the resource locator that represents a number of times that the resource locator was selected, during a search session, for a time period that is longer than respective time periods that one or more other resource locators were selected during the search session; generating a second value for the resource locator that represents a number of times that the resource locator was selected, during a search session, for a time period that is less than respective time periods that one or more other resource locators were selected during the search session; and generating, based on a difference between the first value and the second value, an adjustment factor for the resource locator for adjusting a score associated with the resource locator during a search operation. Other embodiments of this aspect include corresponding systems, apparatus, and computer program products.

In general, another aspect of the subject matter described in this specification can be embodied in methods that include the actions of receiving a search query; obtaining search results for the search query, wherein each search result references a resource locator; for each resource locator, determining whether a sum of the first value and second value associated with the resource locator meets a threshold value; for only each resource locator for which the sum is determined to meet the threshold value, determining an adjustment factor for the resource locator; and ranking the search results at least in part based on the adjustment factors associated with resource locators. Other embodiments of this aspect include corresponding systems, apparatus, and computer programs, configured to perform the actions of the methods, encoded on computer storage devices.

In general, another aspect of the subject matter described in this specification can be embodied in methods that include the actions of for each of the plurality of resource locators: identifying a domain corresponding to the resource locator, the domain having a first domain value that represents a number of times that resource locators that correspond to the domain were selected, during a search session, for a time period that is longer than respective time periods that one or more other resource locators were selected during the search session and a second domain value that represents a number of times that resource locators that correspond to the domain were selected, during a search session, for a time period that is less than respective time periods that one or more other resource locators were selected during the search session; adding the first value for the resource locator to the first domain value; adding the second value for the resource locator to the second domain value; and generating, based on the first domain value and the second domain value, a domain adjustment factor for the domain for adjusting a score associated with the domain during a search operation. Other embodiments of this aspect include corresponding systems, apparatus, and computer programs, configured to perform the actions of the methods, encoded on computer storage devices.

Another aspect of the subject matter described in this specification can be embodied in methods that generally include the actions of for each of a plurality of resource locators: generating a first value for the resource locator that indicates, for a plurality of first sets of search results that each include the resource locator, a number of occurrences of other resource locators that were impressed and not selected when the resource locator was selected; generating a second value for the resource locator that indicates, for a plurality of second sets of search results that each include the resource locator, a number of occurrences of other resource locators that were selected when the resource locator was impressed and not selected; and generating, based on a difference between the first value and the second value, an adjustment factor for the resource locator for adjusting a score associated with the resource locator during a search operation.

In other implementations of this aspect, generating the first value and the second value comprises: identifying sets of search results that each include the resource locator; for each identified set of search results in which the resource locator was selected: incrementing the first value for each other resource locator that was impressed and not selected; and for each identified set of search results in which the resource locator was not selected: incrementing the second value for each other resource locator that was selected.

Additional features of this aspect can also include, for each of the plurality of resource locators: identifying a domain corresponding to the resource locator, the domain having a first domain value that represents, for a plurality of first sets of search results that each include a domain resource locator that corresponds to the domain, a number of occurrences of other resource locators that were impressed and not selected when the domain resource locator was selected and a second domain value that represents, for a plurality of second sets of search results that each include a domain resource locator that corresponds to the domain, a number of occurrences of other resource locators that were selected when the domain resource locator was impressed and not selected; adding the first value for the resource locator to the first domain value; adding the second value for the resource locator to the second domain value; and generating, based on the first domain value and the second domain value, a domain adjustment factor for the domain for adjusting a score associated with the domain during a search operation.

Particular embodiments of the subject matter described in this specification can be implemented to realize one or more of the following advantages. Search engines will be able to rank resources in a manner that takes into account competition with other resources that were selected in the same session. Search results referencing resources that compete well may be promoted, while search results referencing resources that do not compete well may be demoted. Users may receive search results for resources that are ranked based on their competitiveness, increasing the likelihood that a user will find a resource that will satisfy the user's informational need.

The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A competition rank signal is used to measure a quality feature of a web page. The signal is used to rank web pages presented in search results.

Search session data includes a search query and the resource locators (URLs) from search results that were co-clicked as a result of the query. A resource locator for a search result can be considered co-clicked if at least one other search result was also clicked during the search session. The data also includes the length of each click for each co-clicked result. An adjustment factor is generated for each URL based on the number of times the URL was selected for a longer time than another co-clicked URL ("X" value, or "wins") and the number of times the URL was selected for a shorter time than another co-clicked URL ("Y" value, or "losses"). Search results including URLs with a high win/loss (X/Y) ratio are boosted. Conversely, search results including URLs with low win/loss (X/Y) ratios are demoted. The formulas used to generate the adjustment factor that boosts or demotes a search result can vary. The adjustment factor for each URL may be query independent or query dependent, and if a URL corresponds to a search result with a high relevance score, the adjustment factor may be increased in order to ensure it has an effect on the ranking.

Win/loss (X/Y) values are propagated up to the domain level for each URL. If a particular URL does not have enough X/Y values, the X/Y values of the domain associated with that URL may be used. If a domain does not have enough X/Y values, then no adjustment will be made.

In additional implementations, search session data includes the relative positions of resource locators when displayed in search results as a result of a query. For a set of search results, resource locators that were clicked can be compared to resource locators that were impressed but not clicked. A resource locator may be considered impressed and thus counted for an impression when it (or a search result referencing the resource locator) is displayed in a list or set of search results that was presented in response to a query. An adjustment factor for each resource locator may be generated based on the number of other resource locators that were impressed but not clicked when the resource locator was clicked ("X" value, or "wins"), and the number of other resource locators that were clicked when the resource locator was impressed but not clicked ("Y" value, or "losses"). The X/Y values may be used in the same manner as the implementation described above.

Additional features and implementations are described in more detail below.

Figure 1:
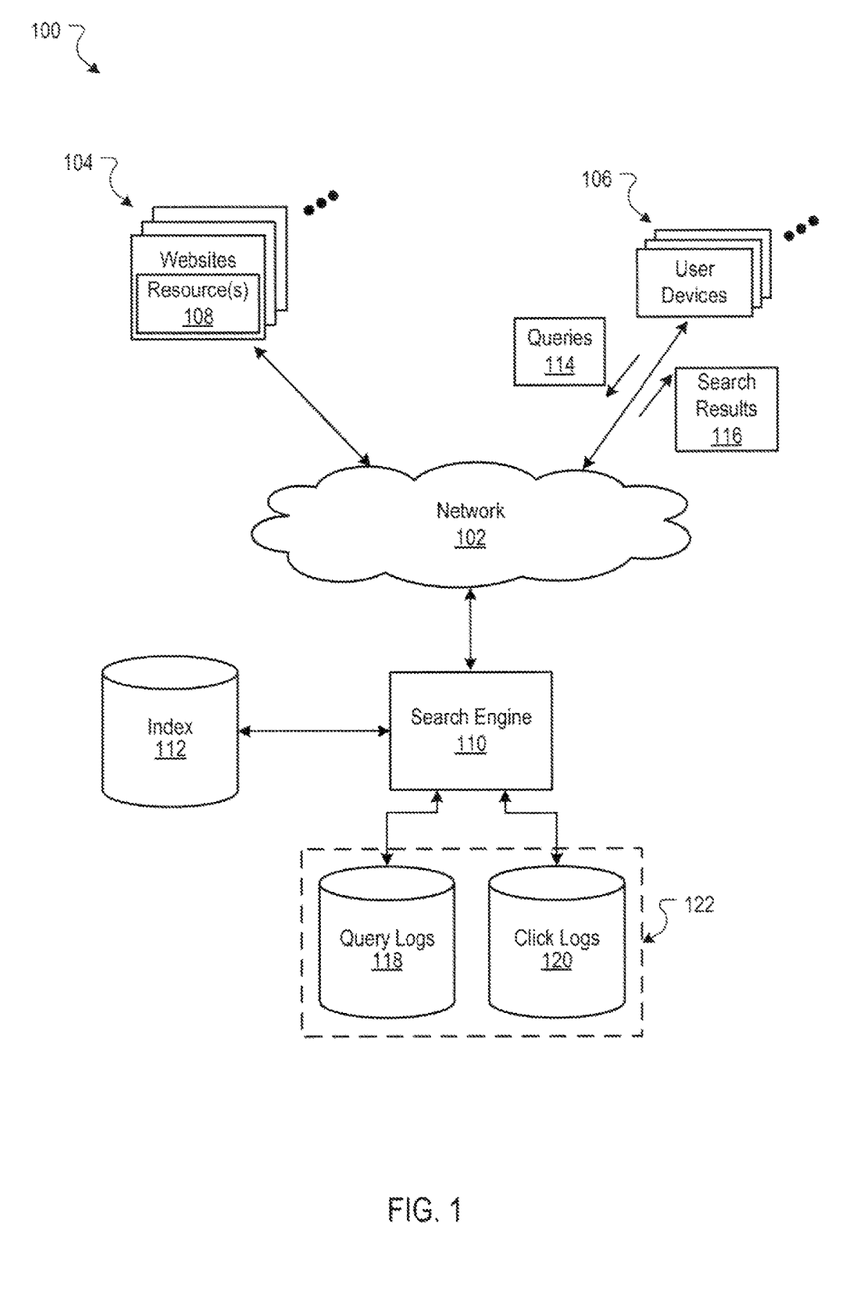
FIG. 1 is a block diagram of an example environment in which a search engine determines resource rankings based, in part, on resource competition.

FIG. 1 is a block diagram of an example environment 100 in which a search engine determines resource rankings based, in part, on resource competition. A computer network 102, such as a local area network (LAN), wide area network (WAN), the Internet, or a combination thereof, connects publisher web sites 104, user devices 106, and the search engine 110. The online environment 100 may include many thousands of publisher web sites 104 and user devices 106.

A website 104 includes one or more resources 108 associated with a domain and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by a publisher over the network 102 and that is associated with a resource address. Resources 108 include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network.

To facilitate searching of these resources 108, the search engine 110 identifies the resources by crawling the publisher websites 104 and indexing the resources provided by the publisher websites 104. The indexed and, optionally, cached copies of the resources, are stored in an index 112.

The user devices 106 submit search queries 114 to the search engine 110. The search queries 114 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results 116 and returns the search results to the user devices 106 in a search results page resource. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In addition, an adjustment factor may be used to generate or adjust IR scores and/or authority scores, or any other resultant search score determined by a search algorithm. The adjustment factor is based on competition values that indicate how often a particular resource locator (and thus the resource) is selected for a length of time greater than, or less than, other resource locators when they are presented together in search results. The ranking of resources based on adjustment factors is described below with reference to FIGS. 3A and 3B. The search results are ordered according to the adjusted scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries 114 received by the search engine 110 are stored in query logs 118. Click data for the queries and the resources referenced by the search results are stored in click logs 120. The query logs 118 and the click logs 120 store search session data 122 that includes data from and related to previous search requests associated with unique identifiers. The click logs store data identifying actions taken responsive to search results provided by the search engine 110, such as which search results were selected and a period of time a user spent viewing a resource identified by the search result. The query logs 118 and click logs 120 can be used to map queries received by the search engine 110 to resources that were identified in search results and the actions taken by users. The click logs 120 and query logs 118 can thus be used by the search engine to determine the sequence of queries received by the search engine, the actions taken in response to the queries, and how often the queries are submitted. In some implementations, data stored in the query logs and click logs may be anonymized.

The query logs 118 and click logs 120 may also be used by the search engine 110 to determine and store competition values for resources with corresponding search results that have been co-clicked during a search session. In particular, the search engine 110 determines search results that were presented for queries during search sessions, and evaluates the relative selection rates of the search results (and thus the selections of the underlying referenced resources) to determine competition values. For example, a first competition value for a resource may represent a number of "wins" for that resource—e.g., the number of times a resource locator's click length exceeded the click length of other co-clicked resource locators, while a second competition value for the resource may represent a number of "losses" for that resource—e.g., the number of times a resource locator's click length was less than the click length of other co-clicked resource locators.

A search session may be defined by a sequence of one or more queries and/or a length of time or some other suitable measure. For example, a search session may be defined by each particular query submitted by a user and the actions taken in response to being presented with the search results for that query, such as search result(s) clicked and click length—e.g., the length of time a resource is visited after its corresponding search result is selected. Another example search session may be defined by a length of time, e.g, ten minutes, after issuing a first search query, and can include query and click data for multiple queries. A search result can be considered co-clicked if at least one other search result was also clicked during the search session. As stated above, competition values for a resource indicate the number of times the resource was selected for a shorter time than another co-clicked resource and the number of times the resource was selected for a longer time than another co-clicked resource.

Figure 2A:
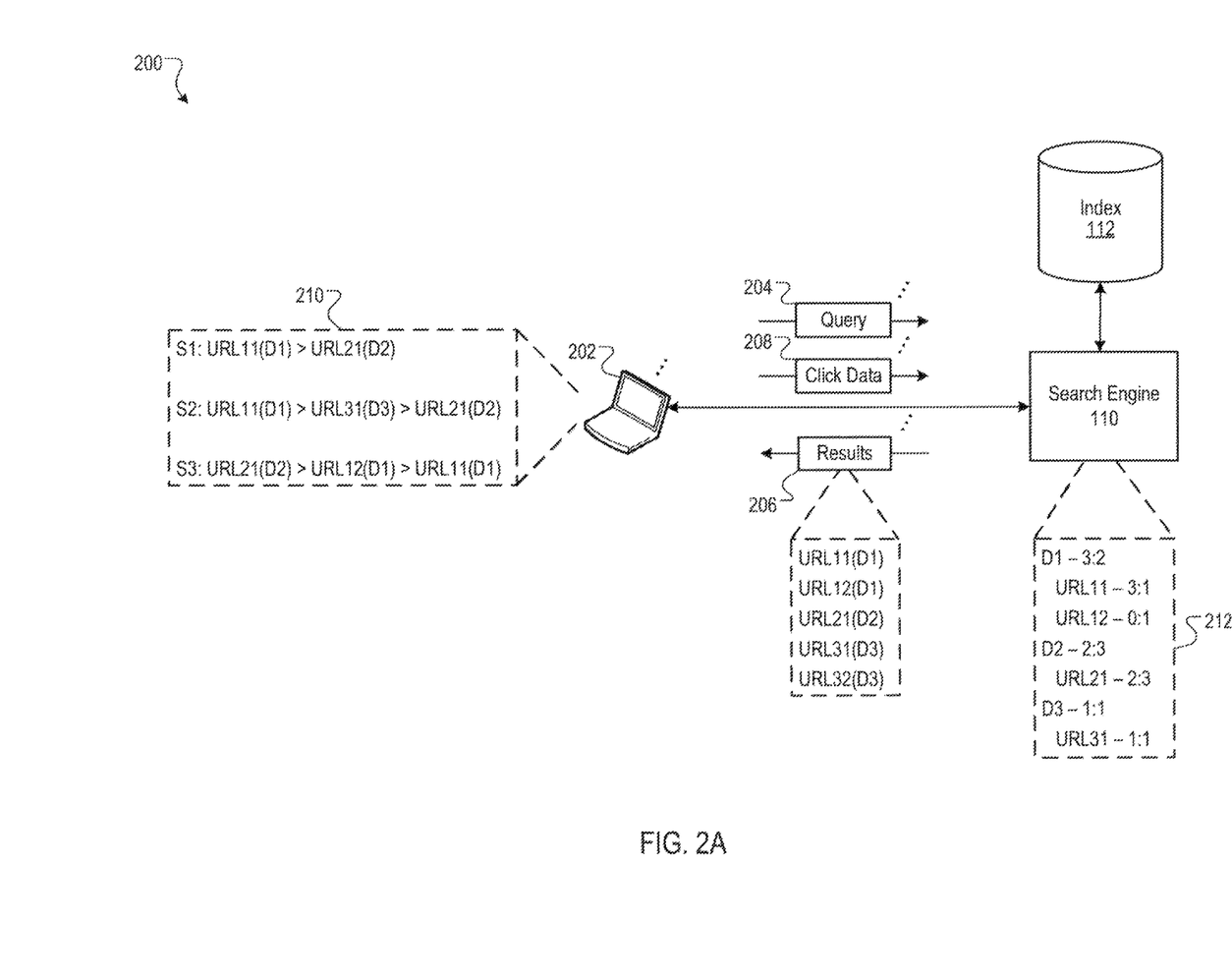
FIG. 2A is an illustration of an example data flow in which resource competition values are generated and resource quality is determined.

As stated above, competition values are recorded for resources in order to determine an adjustment factor. FIG. 2A is an illustration of an example data flow 200 in which resource competition values are generated and resource quality is determined.

In the example data flow 200, user devices 202 send queries 204 to the search engine 110. The search engine 110 obtains results 206 for each query 204 from the index 112, and returns those results 206 to the requesting user devices 202. When the user of a user device 202 selects one or more of the search results, click data 208 is sent to the search engine 110. The click data 208 may indicate, for example, the time a particular search result was clicked, the resource locator of the resource specified by the search result, and the query for which the results were provided.

Additional information, such as the user identifier and search results presented, can also be provided. Additionally, the user device 202 may process instructions that cause it to report subsequent data to the search engine, such as time spent displaying the resource referenced by the selected search result before the user device navigates to another resource or returns to the search results page. Some sites may also implement analytic software that causes such data to also be reported to the search engine 110. From the gathered query and click data, the search engine 110 determines results that have been co-clicked, and the length of a click.

The click data 208 may be used by the search engine 110 to generate competition values for resource locators, and the competition values can be used to generate an adjustment factor to be used in ranking the resources referenced by the resource locators. In some implementations, the search engine 110 will also generate competition values for domains based on the competition values for resources that correspond to the domains. The domain competition values may be used to rank resources whose corresponding competition values are not numerous enough to be considered reliable by the search engine 110. The generation of competition values for resources and domains is described below in further detail.

Example session data 210 represents a click length comparison of co-clicked results. For example, in a session S1, two search results were selected, or co-clicked, by a user. One search result referenced a resource specified by URL11 on domain D1, and the other search result referenced a resource specified by URL21 on domain D2. The session data 210 specifies that, for a session S1, the click length for URL11(D1) exceeded the click length of URL21(D2). For example, a user may have issued a particular query using a user device 202. After being provided with search results for the particular query, the user selected two of them URL11 (D1) and URL21(D2). The example session data 210 may indicate that the amount of time between selecting and then leaving URL11(D1) with the user device 202 exceeded the amount of time between selecting and then leaving URL21 (D2) with the user device 202.

The example session data 210 also indicates that for a second session S2, URL11(D1) was clicked longer than URL31(D3), which was clicked longer than URL21(D2). For a third session S3, URL21(D2) was clicked on longer than URL12(D1), which was clicked on longer than URL11 (D1). The sessions may come from the same or different user devices, and they may involve the same or different queries.

The session data 210 is stored by the search engine 110, which generates first and second values for each resource locator in a set of resource locators. The first value for each resource locator represents a number of times that the resource locator was selected, during a search session, for a period of time that is longer than respective time periods that one or more other resource locators were selected during the search session. In other words, the first value represents the number of times a resource locator's click length exceeded the click length of other co-clicked resource locators. In the example data flow 200, example competition values 212 specify that the first value for URL21(D2) would be a 2, because its click length exceeded the click length of only two co-clicked resources, as indicated by session S3.

The second value generated by the search engine for each resource locator represents a number of times that the resource locator was selected, during a search session, for a period of time that is less than respective time periods that one or more other resource locators were selected during the search session. In other words, the second value represents the number of times a resource locator's click length is less than the click length of other co-clicked resource locators. In the example data flow 200, the second value for URL21 would be a 3, because its click length was less than the click length of three co-clicked resource locators, as indicated by sessions S1 and S2.

In some implementations, such as the example data flow 200, the first and second values for each resource locator ignore click length comparisons to other co-clicked resource locators that correspond to the same domain as the resource locator. This results in resource locators from the same domain not competing against one another. This implementation is reflected in the example data flow 200, where the first value for URL12(D1) is 0, even though the example session data 210 indicates that in session S3 the resource locator URL12(D1) had a click length that exceeded the click length of URL11(D1). URL12(D1)'s click length "win" over URL11(D1) is ignored because both resource locators correspond to the same domain (domain D1).

As noted above, in some implementations, the search engine 110 also generates domain competition values for use in ranking resources. The search engine 110 may identify, for each resource locator in a set of resource locators, a domain that corresponds to the resource locator. For example, the domain that corresponds to each resource locator may be the domain that hosts the resource specified by the resource locator. Each domain may have a first domain value and a second domain value. The first domain value may represent a number of times that resource locators that correspond to the domain were selected, during a search session, for a time period that is longer than respective time periods that one or more other resource locators were selected during a search session.

In the example data flow 200, the first domain value for D1 is 3, because the first values for each of its corresponding resource locators (URL11 and URL12) add up to 3 (3+0=3). The second domain value for D1 is 2, because the second values for each of D1's corresponding resource locators add up to 2 (1+1=2). As D2 and D3 each have competition data for only one corresponding resource locator, their first and second values are the same as the first and second values of their corresponding resource locators.

In some implementations, the first value and second value are query independent. In other words, the "wins" and "losses" for a resource locator are tracked for all queries. In another implementation, the first value and second value are query dependent. In other words, the "wins" and "losses" for a resource locator are tracked with respect to particular queries or groups of queries. For example, wins and losses may be recorded separately for each query, or for groups of queries that correspond to a particular subject matter, or topic. As another example, wins and losses may be recorded separately for queries issued by a desktop computer versus queries issued by a mobile device.

Once first and second values for the resources and the domains have been generated, the search engine 110 generates an adjustment factor for each resource locator based on the first value and second value for the resource locator. The adjustment factor may be used to adjust a score associated with a resource locator during a search operation. For example, the search engine can adjust or generate IR scores and/or authority scores, or any other score, dependent on the search algorithm used, for resources based on the adjustment factor. The ranking of the resources based on adjustment factors is described below with reference to FIGS. 3A and 3B. Any suitable formula may be used to generate an adjustment factor based on the first and second values. One example formula has the following form:

$$AF = C^{\wedge}(-(X-Y)/\max(X,Y)) \quad (1)$$

Where AF is the adjustment factor;
C is a constant;
X is the first value, e.g, the number of "wins" for a resource locator;
Y is the second value, e.g., the number of "losses" for a resource locator; and
max(X, Y) is either X or Y, whichever is greater.

The foregoing example formula places a limit on the adjustment factor. For example, if the constant C is 0.6, the possible range of values for the adjustment factor is approximately 0.6 to 1.667. Using the example competition values 212 and a constant C of 0.6, the adjustment factor for URL11 would be approximately 1.406 (0.6^(-(3−1)/3)= 0.6^(−2/3)=~1.406).

Other suitable formulas may be also be used to generate an adjustment factor. In some implementations, the formula used depends on the score associated with a resource locator during a search operation. For example, if an IR score for a URL exceeds a threshold IR value, an additional constant may be used to increase the impact of an adjustment factor in the search operation. Consider the following example formula:

$$AF = C^{\wedge}((-B*(X-Y))/\max(X,Y)) \quad (2)$$

Where B is a second constant, which may be used to increase or decrease the impact of the difference between X and Y values on the adjustment factor. For example, if B is 1.5, and C remains 0.6, the possible range of values for the adjustment factor becomes approximately 0.465 to 2.152. Using the example competition values 212, a constant C of 0.6, and a second constant B of 1.5, the adjustment factor for URL11 would be approximately 1.667 (0.6^(−1.5*(3−1)/ 3=0.6^(−3/3)=~1.667). Adjustment factors, once generated, may be stored in an index, such as the index 112.

In some implementations, the search engine 110 also generates a domain adjustment factor for each domain based on the domain's first domain value and second domain value. As with the adjustment factor for resource locators, any suitable formula may be used to generate the domain adjustment factor. The particular formula used to generate a domain adjustment value may be the same as, or different from, the formula(s) used to generate adjustment factors for resource locators. Domain adjustment factors may be used to adjust a score associated with a domain during a search operation.

Figure 2B:
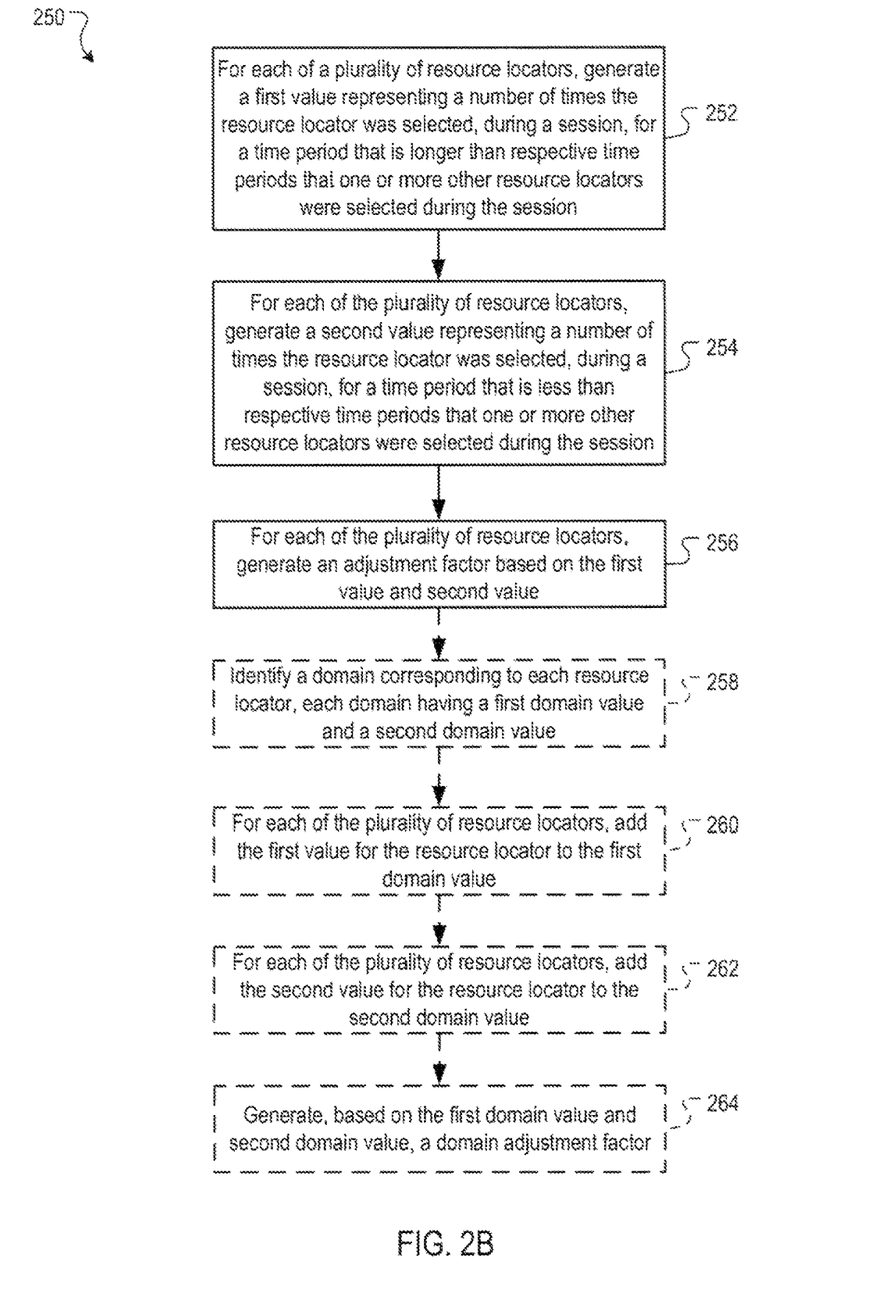
FIG. 2B is a flow diagram of an example process for generating resource competition values and determining resource quality.

FIG. 2B is a flow diagram of an example process 250 for generating resource competition values and determining resource quality. The process 250 may be used by a data processing apparatus, such as a search engine.

For each resource locator in a set of resource locators, the process 250 generates a first value representing a number of times the resource locator was selected, during a session, for a time period that is longer than respective time periods that one or more other resource locators were selected during the session (252). For each resource locator in the set of resource locators, the process 250 also generates a second value representing a number of times the resource locator was selected, during a session, for a time period that is less than respective time periods that one or more other resource locators were selected during the session (254).

In some implementations, generating the first value and second value for a resource locator includes identifying search sessions during which the resource locator and one or more other resource locators were selected. Search sessions may be identified by a search engine, and they may indicate the resource locators selected by a user in response to presenting search results to that user. Search sessions data obtained by the search engine may also indicate a click length associated with each selected resource locator.

Generating the first value and second value for a resource locator may also include, for each identified search session for a resource locator, i) determining respective time periods that the resource locator and each of the other resource locator(s) were selected, ii) determining selection pairs, each selection pair including the resource locator and one of the other resource locator(s), iii) incrementing the first value for each selection pair in which the time period that the resource locator was selected is greater than the time period that the other resource locator was selected, and iv) incrementing the second value for each selection pair in which the time period that the resource locator was selected is less than the time period that the other resource locator was selected.

After first and second values have been generated, the process 250 generates, for each resource locator in the set of resource locators, an adjustment factor based on the first value and second value (256). As indicated previously, the adjustment factor for a resource locator is for adjusting a score associated with the resource locator during a search operation.

In some implementations, e.g., in implementations using the example formula (1) above, generating an adjustment factor for a resource locator includes i) determining a maximum value that is equal to the greater of the first value and second value, ii) determining a difference value that is equal to the first value minus the second value, iii) determining a quotient value that is equal to the difference value divided by the maximum value, and iv) determining the adjustment factor based on a product of a constant to the power of the quotient value. In some implementations, e.g., in implementations using the example formula (2) above, generating the adjustment factor also includes multiplying the quotient value by a second constant in response to determining that an information retrieval score associated with the resource locator exceeds an information retrieval score threshold.

In some implementations, as previously described with respect to FIG. 2A, the process 250 optionally generates domain adjustment factors (258-264). For each of the resource locators in the set of resource locators, the process 250 identifies a domain corresponding to the resource locator, each domain having a first domain value and a second domain value (258). The first domain value represents a number of times that resource locators that correspond to the domain were selected, during a search session, for a time period that is longer than respective time periods that one or more other resource locators were selected during the search session. The second domain value represents a number of times that resource locators that correspond to the domain were selected, during a search session, for a time period that is less than respective time periods that one or more other resource locators were selected during the search session.

For each resource locator in the set of resource locators, the process 250 adds the first value for the resource locator to the first domain value (260) and adds the second value for the resource locator to the second domain value (262). The process 250 then generates, based on the first domain value and the second domain value, a domain adjustment factor (264). The domain adjustment factor may be used to adjust a score associated with the domain during a search operation.

Figure 3A:
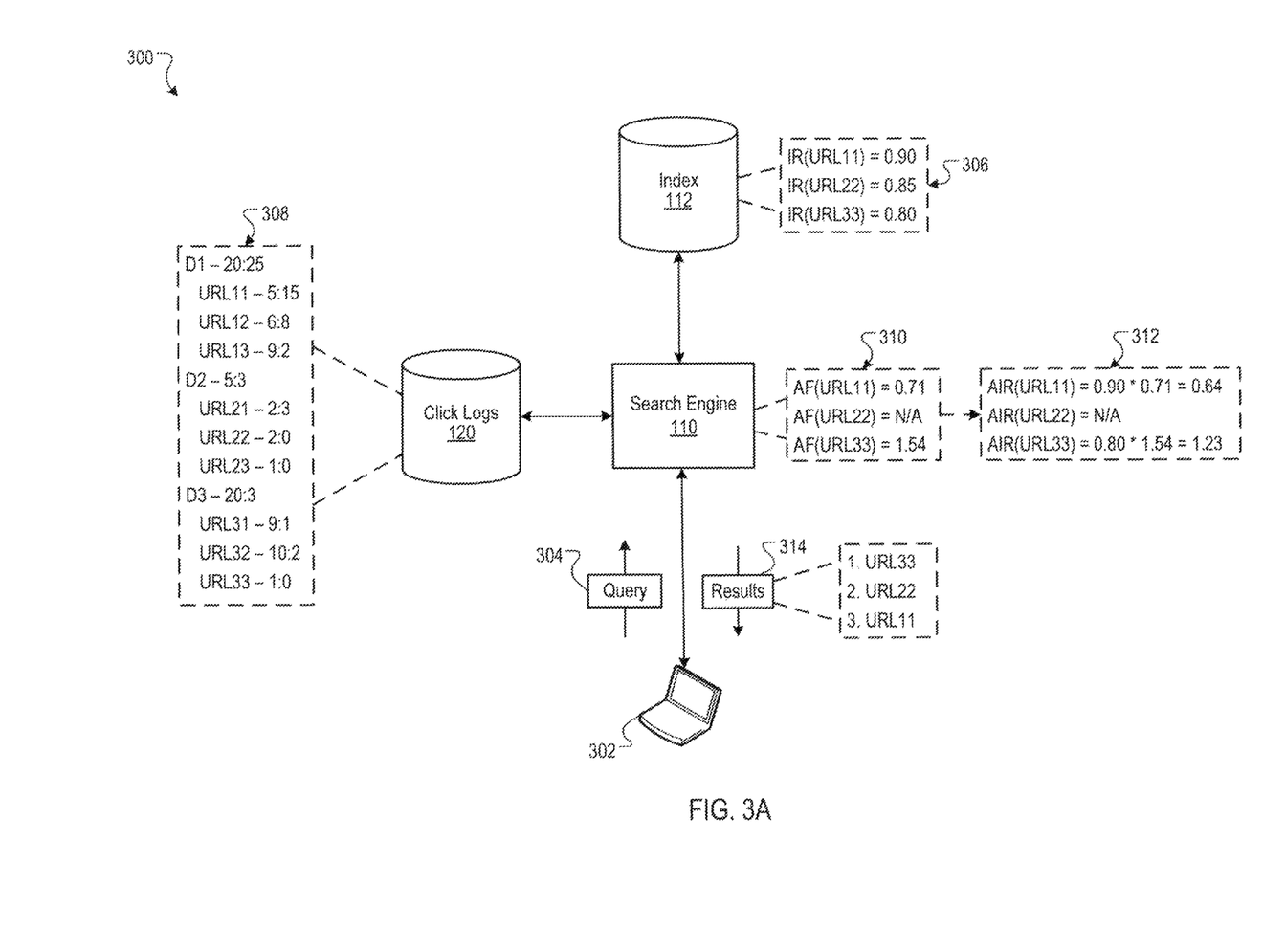
FIG. 3A is an illustration of an example data flow in which resources are ranked based on competition values.

As described above, the adjustment factors for resource locators, and the domain adjustment factors, can be derived from competition values and used to affect search scores and/or rankings during a search operation. Resources are ranked based on several factors, such as the content of the resource and/or the authority of the resource relative to other resources. However, in some situations adjustment factors can be used to adjust the search scores of the resources. Adjustments can be separately implemented in a search engine or implemented in combination in the search engine. FIG. 3A is an illustration of an example data flow 300 in which resources are ranked based on competition values.

The search engine receives a search query 304 from a user device 302 and obtains search results 306 for that query 304. Each search result references a resource locator of a resource, and each resource may be associated with a search score that defines a respective position of the resource in an order of responsiveness to the query. For example, resources that are determined to be highly responsive to the query have a search score that is higher than the search score of a resource that is determined to be marginally responsive to the query. Any suitable scale or scales may be used for search scores, such as a scale of 0 to 1, where 0 indicates a least amount of relevance with respect to a query, and 1 indicates a highest amount of relevance with respect to a query. In the example data flow 300, an information retrieval (IR) score is shown for each of three resources respectively referenced by a different resource locator from the others. The IR score for URL11 is 0.90, the IR score for URL22 is 0.85, and the IR score for URL33 is 0.80.

The search engine 110 determines, for each resource referenced by the search results 306, whether a sum of the first value and second value for the resource locator meet a threshold value. The threshold value may be established by the search engine, and it is designed to ensure that a sufficient number of competition values have been recorded before they are used to affect the rankings of corresponding resources. For example, given the data in the example data flow 300 and a threshold value of 10, the search engine 110 can determine that URL11 meets the threshold (5+15=20), but that URL22 and URL33 do not meet the threshold (sums of 2 and 1, respectively). In some implementations, the competition values 308, which include the first and second values for resource locators, may be stored in click logs 120 accessible by or provided to the search engine 110. As described with reference to FIG. 2A, the first and second values may be query independent, or query dependent.

As described above, in some situations the search engine 110 may use domain competition values as the competition values for a resource. In some implementations, for each resource locator whose sum of first and second values does not meet the threshold, the search engine 110 may identify the domain that corresponds to the resource locator and determine if a second sum of the first domain value and second domain value for the domain meets a domain threshold value. The domain threshold value may also be established by the search engine, and may be the same as, or different from, the above threshold value. For example, given the data in the example flow 300 and a domain threshold of 10, the search engine 110 can determine that the domain D2 of URL22 does not meet the domain threshold (second sum of 8), while the domain D3 of URL33 does meet the domain threshold (second sum of 23).

For each resource locator for which the sum of its first and second values meets the threshold value, the search engine 110 determines an adjustment factor for the resource locator. In some implementations, adjustment factors 310 may be predetermined and obtained, for example, from the index 112. In another implementation, adjustment factors 310 can be created in response to receiving the query. In some implementations, the search engine 110 can determine adjustment factors 310 for resource locators based on adjustment factors for their corresponding domains.

Using the sample competition data 308 and the sample formula (1) described above with reference to FIG. 2, adjustment factors 310 can be determined for each of the resource locators referenced by the search results 306. For example, the adjustment factor for URL11 may be approximately 0.71 ($0.6^{(10/20)}$), and the adjustment factor for URL33 may be the same as the domain adjustment factor, which is approximately 1.54 ($0.6^{(-17/20)}$). Competition values for resource locator URL22 did not meet the example threshold of 10, and the competition values for is corresponding domain, domain D2, also failed to meet the example domain threshold value of 10. Accordingly, no adjustment factor is determined for the resource locator URL22.

The search engine 110 ranks the resources based on the adjustment factors 310 associated with the resource locators. In the example data flow 300, adjusted IR scores 312 are generated by multiplying the original IR score for a resource locator by the adjustment factor for that resource locator. Accordingly, the adjusted IR scores 312 for URL11 and URL33 are 0.64 and 1.23, respectively. When resources are ranked by the search engine 110, adjusted IR scores are used for URL11 and URL33, while the initial IR score is used for URL22. In the example data flow 300, this results in URL33 being ranked first, URL22 being ranked second, and URL11 being ranked third. The ranked results 314 may then be provided to the user device 302 from which the query 304 came.

Figure 3B:
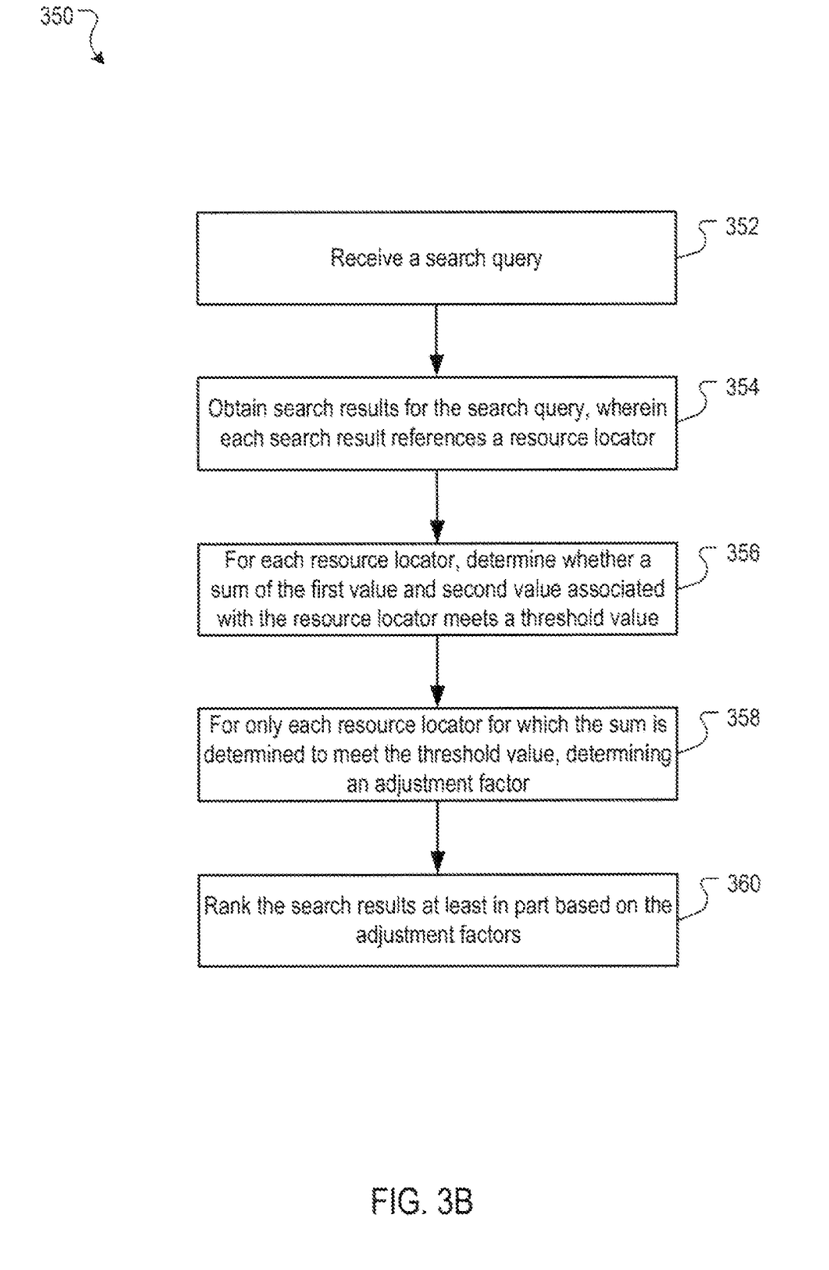
FIG. 3B is a flow diagram of an example process for ranking resources based on competition values.

FIG. 3B is a flow diagram of an example process for ranking resources based on competition values. The process 350 may be used by a data processing apparatus, such as a search engine 110.

The process 350 receives a search query (352), e.g., from a user device. The process 350 then obtains search results for the search query, and each search result references a resource locator associated with the resource (354). In some implementations, the resources referenced by the search results have search scores that indicate relevance of each resource to the search query.

For each resource locator, the process 350 determines whether a sum of the first value and second value associated with the resource locator meets a threshold value (356). As described above, the first value and second value for a resource locator represent the recorded competition values, e.g., the "wins" and "losses" for each resource locator. The threshold value is designed to ensure that enough data has been collected to get a representative sample of a resource locator's competition values.

For only each resource locator for which the sum is determined to meet the threshold value, the process 350 determines an adjustment factor (358). As described above, the adjustment factor is based on the first value and second value for each resource locator, and may be used to adjust a search score for the resource locator.

In some implementations, for only each resource locator for which the first sum does not meet the threshold value, the process 350 identifies a domain corresponding to the resource locator. The process 350 may then determine whether a second sum of a first domain value and second domain value associated with the domain meets a domain threshold value. For only each resource locator for which the second sum meets the domain threshold value, the process 350 determines that an adjustment factor for the resource locator is equal to the domain adjustment factor for the domain that corresponds to the resource locator. This implementation is designed to use the competition values for a domain if the competition values for a resource locator are not numerous enough to meet a threshold value.

The process 350 ranks the search results at least in part based on the adjustment factors associated with the resource locators (360). As described above, any suitable formula may be used to rank resources based on the adjustment factors. For example, the adjustment factor for a resource locator may be multiplied by an information retrieval score associated with the resource locator to obtain an adjusted search score to be used in ranking the resource locator with respect to other resource locators referenced by the search results. Once the resources have been ranked, search results including the resource locators referencing the resources may be provided to a requesting device, such as a user device.

In some implementations, competition values may be based on impressions of resource locators. A resource locator may be considered impressed and thus counted for an impression when it (or a search result referencing the resource locator) is displayed in a list or set of search results that was presented in response to a query. In this implementation, if a resource locator is impressed and selected, and other resource locators were impressed and not selected, the resource locator may receive a "win." Conversely, if a resource locator is impressed, but not selected, it may receive a "loss" when another resource locator in the set of search results was selected.

In some implementations, a resource locator is only considered impressed when another resource locator that was in a lower position in the list of search results, relative to the resource locator, was selected. These implementations are designed to take into consideration that a user is assumed to have viewed each resource locator above the selected resource locator. The same assumption, however, may not be made with respect to resource locators below the selected resource locator. For example, if a list of search results presented in response to a query includes 10 resource locators, and the resource locator in position 5 was selected, the resource locators in positions 1-4 may be considered impressed, while the resource locators in positions 6-10 are not considered impressed. In some implementations, selected resource locators may also be considered impressed, e.g., in the foregoing example, the resource locator in position 5 may also be considered impressed.

Figure 4A:
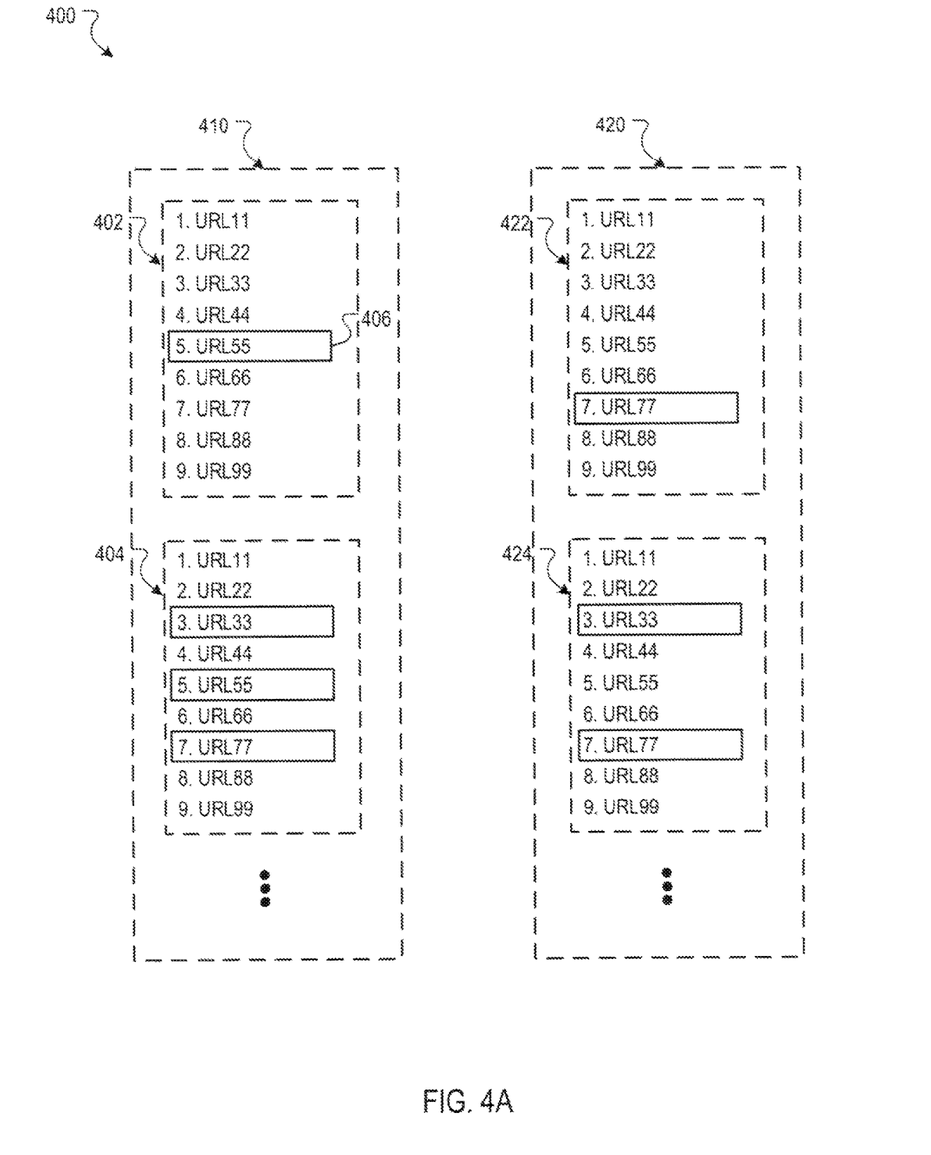
FIG. 4A is an illustration of example sets of search results for which resource competition values are determined based on impressions.

FIG. 4A is an illustration 400 of example sets of search results for which resource competition values are determined based on impressions. The illustration is described with reference to a single resource locator, but resource competition values may be calculated for any number of resource locators.

In the example illustration 400, sets of search results, 402 and 404, are part of a first group of search result sets 410 that each include a resource locator—e.g., resource locator URL55 406. The sets are the same, but the selections of the search results in each set differ to illustrate the differences in impressions. In each set of search results in the first group 410, URL55 was selected—as indicated by the box surrounding URL55 406. From this first group of search results, a first value—e.g., a "wins" value—is generated for URL55 that indicates a number of occurrences of other resource locators that were impressed but not selected.

The number of wins and losses attributed to a URL depends on the impression attribution scheme. For example, assume that an impression win is counted for each URL that is shown, regardless of its position relative to another URL that is selected. For example, search result set 402 includes 8 other resource locators that were impressed but not selected, while search result set 404 includes 6 other resource locators that were impressed by not selected. In this example, the first value for URL55 would be 14—the sum of all resource locators that were impressed, but not selected, when URL55 was selected.

Conversely, assume that a different impression scheme is used in which the first value for a resource locator only indicates the number of occurrences of other resource locators displayed in a higher position in a list of search results, relative to the resource locator, being impressed and not selected. This implementation ensures that a selected resource locator is not attributed a "win" if a resource locator ranked lower than the selected resource locator is impressed but not selected. The model used here is based on the assumption that URLs below a last selected URL are not viewed, and therefore competition between the lower URLs and the last selected URL cannot be inferred. For example, in the example search result set 402, the only resource locator selected is URL55, which is in position 5 on the list. Every resource locator above position 5 can be counted in the generation of the first value for URL55, while every resource locator below position 5 will not be considered in generating the first value for URL55. In the example search result set 404, resources in positions 3, 5, and 7 on the list were selected. Resource locators in positions 1, 2, and 4 would be counted in the generation of the first value for URL 55, while the resource locators in positions 6, 8, and 9, while impressed and not selected, would not be counted in calculating the first value for URL55 because they are in a position below URL55. In this implementation, a first value for URL55 would be 7—e.g., there were 4 resource locators impressed but not selected in the first set 402, and 3 resource locators impressed but not selected in the second set 404.

While the sets 402 and 404 resulted in "wins" for URL55, the sets 422 and 424 result in "losses" for URL55. In particular, in each set of search results in a second group 420, URL55 was not selected—as indicated by the lack of a box surrounding URL55 406. From this second group of search results a second value—e.g., a "losses" value—is generated for URL55 that indicates a number of occurrences of other resource locators that were selected when the resource locator was impressed and not selected. Again, the scheme for attributing losses can vary in a similar manner as described above. For example, search result set 422 includes one resource locator that was selected, and search result set 424 includes two resource locators that were selected. In this example, the second value for URL55 would be 3—the sum of all resource locators that were selected when URL55 was impressed but not selected.

In other loss attribution schemes, the second value for a resource locator only indicates the number of occurrences of another resource locator being selected when the selected resource locator is displayed in a lower position in a list of search results. This is designed to ensure that a resource locator is not attributed a "loss" if another resource locator ranked higher than the resource locator is selected. In the example search result set 424, URL33 is in position 3 and was selected, and URL77 is in position 7 and was selected. URL55 would be attributed a "loss" for URL77, but not for URL33, because URL33 was displayed on a position in the list higher than URL55.

The "win" and "loss" values may be used generate an adjustment factor. In some implementations, however, these first and second values for a resource locator may also take into account the quality associated with particular "wins" and "losses." For example, the ordinal position of resource locators in lists of search results may be taken into consideration when generating the first and second values. In the example set of search results 402, URL55 may receive a "win" for each resource locator in positions 1-4. However, the quality of the "win" over URL11 in position 1 may be greater than the quality associated with a win over URL44 in position 4. Accordingly, the "win" over URL11 may increase the first value for URL55 greater than the "win" over URL44. With respect to the second value for URL55, a "loss" to a resource locator one position below URL55 may not affect the second value as much as a "loss" to a resource locator 4 positions below URL55. The quality difference may be reflected in a scaling of each win and loss value by an appropriate factor that is proportional to the differences in the ordinal positions of a selected URL and an unselected URL.

Data describing the search result sets may be stored in a data store and/or log, such as the query log 118 and/or click log 120. Data may be also stored separately for each resource locator, on a query-by-query basis, and/or by any other suitable means. Competition values generated based on impressions of resource locators in search results may be separate from, in addition to, or combined with competition values generated based on co-clicks of resources. The competition values generated based on impressions of resource locators in search results may also be used in the same ways described above with reference to competition values based on co-clicks of resources. For example, competition values generated based on impressions of resource locators may be propagated to the domain level for domain level competition value uses.

Figure 4B:
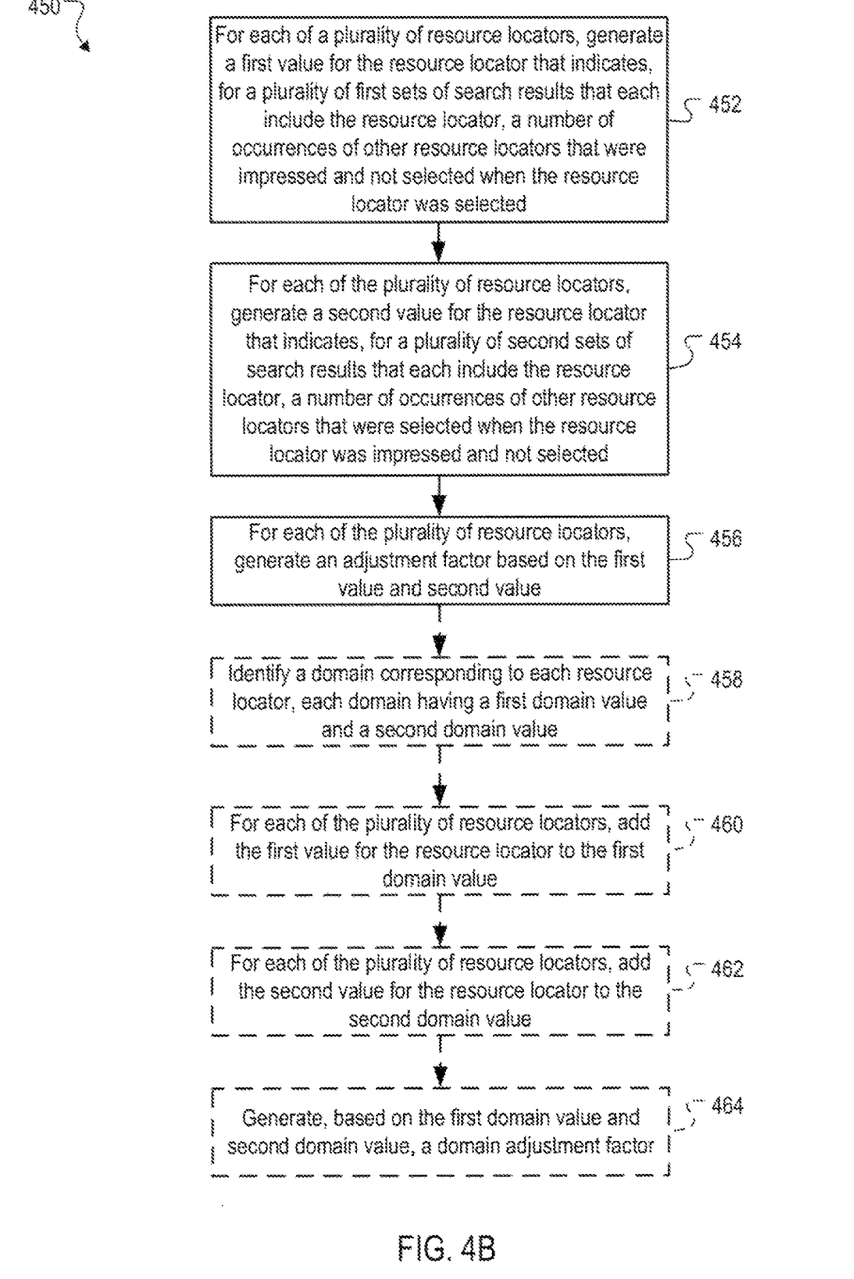
FIG. 4B is a flow diagram of an example process for generating resource competition values based on impressions.

FIG. 4B is a flow diagram of an example process for generating resource competition values based on impressions. The process 450 may be used by a data processing apparatus, such as a search engine 110.

For each of a plurality of resource locators, the process (450) generates a first value for the resource locator that indicates, for a plurality of first sets of search results that each include the resource locator, a number of occurrences of other resource locators that were impressed and not selected when the resource locator was selected (452). In some implementations, the first value only indicates the number of occurrences of other resource locators being impressed and not selected when the other impressed and not selected resource locators are displayed in a higher position in a list of search results, relative to the resource locator. In this implementation, a resource locator is only attributed a "win" for resource locators that were displayed in a higher position in a list of search results.

For each of the plurality of resources, the process (450) generates a second value for the resource locator that indicates, for a plurality of second sets of search results that each include the resource locator, a number of occurrences of other resource locators that were selected when the resource locator was impressed and not selected (454). In some implementations, the second value for the resource locator only indicates the number of occurrences of other resource locators being selected when a selected resource locator is displayed in a lower position in a list of search results, relative to the resource locator. In this implementation, a resource locator is only attributed a "loss" for resource locators that were displayed in a lower position in a list of search results.

An adjustment factor is generated for the resource locator based on the first value and second value (456). In some implementations, the adjustment factor is used for adjusting a score associated with the resource locator during a search operation.

In some implementations, the process (450) may identify a domain corresponding to each resource locator (458). Each domain may have a first domain value and a second domain value. The first domain value may represent, for a plurality of first sets of search results that each include a domain resource locator that corresponds to the domain, a number of occurrences of other resource locators that were impressed and not selected when the domain resource locator was selected. The second domain value may represent, for a plurality of second sets of search results that each include a domain resource locator that corresponds to the domain, a number of occurrences of other resource locators that were selected when the domain resource locator was impressed and not selected.

For each of the plurality of resource locators, the process (450) may add the first value for the resource locator to the first domain value of the domain that corresponds to the resource locator (460). For each of the plurality of resource locators, the process (450) may add the second value for the resource locator to the second domain value of the domain that corresponds to the resource locator (462).

The process (450) may then generate, based on the first domain value and second domain value, a domain adjustment factor (464). The domain adjustment factor may be used to adjust a score associated with the domain during a search operation.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer implemented method performed by data processing apparatus, the method comprising:
for each of a plurality of domains:
generating a first value for the domain that indicates, for a plurality of first sets of search results, wherein each first set was provided in response to a query and each first set includes a resource locator that belongs to the domain, a number of occurrences of other resource locators that were displayed with the resource locator and not selected when the resource locator was displayed and selected;
generating a second value for the resource locator that indicates, for a plurality of second sets of search results, wherein each second set was provided in response to the query and each second set includes the resource locator that belongs to the domain, a number of occurrences of other resource locators that were selected when the resource locator was displayed with the other resource locators and not selected; and
generating, for the search query and based on a difference between the first value and the second value, an adjustment factor for the domain for adjusting a score associated with a resource locator belonging to the domain during a search operation for the search query, the generating of the adjustment factor comprising determining a ratio of the difference of the first value and the second value to a maximum of the first value and the second value;
receiving a search query;
obtaining search results for the search query, wherein each search result references a resource locator;
for each resource locator, determining whether a sum of the first value and second value associated with the domain of the resource locator meets a threshold value;
for only each resource locator for which the sum is determined to meet the threshold value, determining the adjustment value for the domain to which the resource locator belongs as an adjustment factor for the resource locator; and ranking the search results at least in part based on the adjustment factors associated with resource locators.

2. The method of claim 1, wherein each resource locator that belongs to the domain and that was displayed is a resource locator that was displayed in a list of search results presented in response to the query when another resource locator that was in a lower position in the list of search results, relative to the resource locator, was selected.

3. The method of claim 1, wherein the first value for the resource locator only indicates the number of occurrences of other resource locators being displayed and not selected when the other displayed and not selected resource locators are displayed in a higher position in a list of search results, relative to the resource locator.

4. The method of claim 1, wherein the second value for the resource locator only indicates the number of occurrences of other resource locators being selected when a selected resource locator is displayed in a lower position in a list of search results, relative to the resource locator.

5. The method of claim 1, wherein the first value is further based on, for each occurrence of other resource locators that were displayed and not selected when the resource locator was selected, an ordinal position of the resource locator in the corresponding set of search results relative ordinal positions of the other resource locators, and wherein the second value is further based on, for each occurrence of other resource locators that were selected when the resource locator was displayed and not selected, an ordinal position of the resource locator in the corresponding set of search results relative ordinal positions of the other resource locators.

6. A computer implemented method performed by data processing apparatus, the method comprising:

for each of a plurality of domains:
generating a first value for the domain that indicates, for a plurality of first sets of search results, wherein each first set was provided in response to a query and each first set includes a resource locator that belongs to the domain, a number of occurrences of other resource locators that were displayed with the resource locator and not selected when the resource locator was displayed and selected;

generating a second value for the resource locator that indicates, for a plurality of second sets of search results, wherein each second set was provided in response to the query and each second set includes the resource locator that belongs to the domain, a number of occurrences of other resource locators that were selected when the resource locator was displayed with the other resource locators and not selected; and generating, for the search query and based on a difference between the first value and the second value, an adjustment factor for the domain for adjusting a score associated with a resource locator belonging to the domain during a search operation for the search query;

wherein generating an adjustment factor for the resource locator comprises:
determining a maximum value that is equal to the greater of the first value and second value;
determining a difference value that is equal to the first value minus the second value;

determining a quotient value that is equal to the difference value divided by the maximum value; and
determining the adjustment factor based on a product of a constant to the power of the quotient;

receiving a search query;

obtaining search results for the search query, wherein each search result references a resource locator;

for each resource locator, determining whether a sum of the first value and second value associated with the domain of the resource locator meets a threshold value;

for only each resource locator for which the sum is determined to meet the threshold value, determining the adjustment value for the domain to which the resource locator belongs as an adjustment factor for the resource locator; and ranking the search results at least in part based on the adjustment factors associated with resource locators.

7. A system, comprising:

a data processing apparatus having one or more processors; and a data store storing instructions that, when executed by the data processing apparatus, cause the data processing apparatus to perform operations comprising:

for each of a plurality of domains:
generating a first value for the domain that indicates, for a plurality of first sets of search results, wherein each first set was provided in response to a query and each first set includes a resource locator that be longs to the domain, a number of occurrences of other resource locators that were displayed with the resource locator and not selected when the resource locator was displayed and selected;

generating a second value for the resource locator that indicates, for a plurality of second sets of search results, wherein each second set was provided in response to the query and each second set includes the resource locator that belongs to the domain, a number of occurrences of other resource locators that were selected when the resource locator was displayed with the other resource locators and not selected; and generating, for the search query and based on a difference between the first value and the second value, an adjustment factor for the domain for adjusting a score associated with a resource locator belonging to the domain during a search operation for the search query, the generating of the adjustment factor comprising determining a ratio of the difference of the first value and the second value to a maximum of the first value and the second value;

receiving a search query;

obtaining search results for the search query, wherein each search result references a resource locator;

for each resource locator, determining whether a sum of the first value and second value associated with the domain of the resource locator meets a threshold value;

for only each resource locator for which the sum is determined to meet the threshold value, determining the adjustment value for the domain to which the resource locator belongs an adjustment factor for the resource locator; and ranking the search results at least in part based on the adjustment factors associated with resource locators.

8. The system of claim 7, wherein each resource locator that belongs to the domain and that was displayed is a resource locator that was displayed in a list of search results presented in response to the query when another resource locator that was in a lower position in the list of search results, relative to the resource locator, was selected.

9. The system of claim 7, wherein the first value for the resource locator only indicates the number of occurrences of other resource locators being displayed and not selected when the other displayed and not selected resource locators are displayed in a higher position in a list of search results, relative to the resource locator.

10. The system of claim 7, wherein the second value for the resource locator only indicates the number of occurrences of other resource locators being selected when a selected resource locator is displayed in a lower position in a list of search results, relative to the resource locator.

11. The system of claim 7, wherein the first value is further based on, for each occurrence of other resource locators that were displayed and not selected when the resource locator was selected, an ordinal position of the resource locator in the corresponding set of search results relative ordinal positions of the other resource locators, and wherein the second value is further based on, for each occurrence of other resource locators that were selected when the resource locator was displayed and not selected, an ordinal position of the resource locator in the corresponding set of search results relative ordinal positions of the other resource locators.

12. A system, comprising:
a data processing apparatus having one or more processors; and
a data store storing instructions that, when executed by the data processing apparatus, cause the data processing apparatus to perform operations comprising:
for each of a plurality of domains:
generating a first value for the domain that indicates, for a plurality of first sets of search results, wherein each first set was provided in response to a query and each first set includes a resource locator that be longs to the domain, a number of occurrences of other resource locators that were displayed with the resource locator and not selected when the resource locator was displayed and selected;
generating a second value for the resource locator that indicates, for a plurality of second sets of search results, wherein each second set was provided in response to the query and each second set includes the resource locator that belongs to the domain, a number of occurrences of other resource locators that were selected when the resource locator was displayed with the other resource locators and not selected; and
generating, for the search query and based on a difference between the first value and the second value, an adjustment factor for the domain for adjusting a score associated with a resource locator belonging to the domain during a search operation for the search query;
wherein generating an adjustment factor for the resource locator comprises:
determining a maximum value that is equal to the greater of the first value and second value;
determining a difference value that is equal to the first value minus the second value;
determining a quotient value that is equal to the difference value divided by the maximum value; and
determining the adjustment factor based on a product of a constant to the power of the quotient;

receiving a search query;
obtaining search results for the search query, wherein each search result references a resource locator;
for each resource locator, determining whether a sum of the first value and second value associated with the domain of the resource locator meets a threshold value;
for only each resource locator for which the sum is determined to meet the threshold value, determining the adjustment value for the domain to which the resource locator belongs as an adjustment factor for the resource locator; and
ranking the search results at least in part based on the adjustment factors associated with resource locators.

13. A data storage device storing instructions that, when executed by a data processing apparatus, cause the data processing apparatus to perform operations comprising:
for each of a plurality of domains:
generating a first value for the domain that indicates, for a plurality of first sets of search results, wherein each first set was provided in response to a query and each first set includes a resource locator that be longs to the domain, a number of occurrences of other resource locators that were displayed with the resource locator and not selected when the resource locator was displayed and selected;
generating a second value for the resource locator that indicates, for a plurality of second sets of search results, wherein each second set was provided in response to the query and each second set includes the resource locator that belongs to the domain, a number of occurrences of other resource locators that were selected when the resource locator was displayed with the other resource locators and not selected; and
generating, for the search query and based on a difference between the first value and the second value, an adjustment factor for the domain for adjusting a score associated with a resource locator belonging to the domain during a search operation for the search query;
wherein generating an adjustment factor for the resource locator comprises:
determining a maximum value that is equal to the greater of the first value and second value;
determining a difference value that is equal to the first value minus the second value;
determining a quotient value that is equal to the difference value divided by the maximum value; and
determining the adjustment factor based on a product of a constant to the power of the quotient;
receiving a search query;
obtaining search results for the search query, wherein each search result references a resource locator;
for each resource locator, determining whether a sum of the first value and second value associated with the domain of the resource locator meets a threshold value;
for only each resource locator for which the sum is determined to meet the threshold value, determining the adjustment value for the domain to which the resource locator belongs as an adjustment factor for the resource locator; and
ranking the search results at least in part based on the adjustment factors associated with resource locators.

* * * * *